United States Patent [19]

Jagieniak et al.

[11] 4,330,700
[45] May 18, 1982

[54] PLASMABURNER WITH CONTACT PROTECTION

[76] Inventors: Peter Jagieniak, R. Harbig Str. 24, 798 Finsterwalde; Hans Koerdt, Hauptstr. 164, 7971 Schönborn; Jochen Böhme, Tauschenstr. 38; Dieter Odrich, Libenauer Str. 25, both of 8021 Dresden; Rudolf Pochert, Leonhardistr. 20; Peter Wiese, Veilchenweg 32, both of 8054 Dresden, all of German Democratic Rep.

[21] Appl. No.: 133,957

[22] Filed: Mar. 25, 1980

[51] Int. Cl.³ .................................................. B23K 9/00
[52] U.S. Cl. .......................... 219/121 PP; 219/121 PR; 219/121 PM; 219/121 PT; 219/121 P; 219/130.21
[58] Field of Search ................. 219/121 PM, 121 PW, 219/121 PR, 121 PP, 121 PT, 121 P, 74, 75, 76.16, 130.21, 124.03; 313/231.4, 231.5, 231.6

[56] References Cited

U.S. PATENT DOCUMENTS

| 3,558,973 | 1/1971 | Pochert et al. | 219/121 PW |
| 3,571,556 | 3/1971 | Wustner | 219/121 PP |
| 3,745,321 | 7/1973 | Shapiro et al. | 219/121 PP |
| 3,830,428 | 8/1974 | Dyos | 219/121 PP |
| 3,914,575 | 10/1975 | Eichler | 219/121 PW |

FOREIGN PATENT DOCUMENTS

| 2140241 | 2/1973 | Fed. Rep. of Germany | 219/121 P |
| 2541166 | 4/1976 | Fed. Rep. of Germany | 219/121 P |

*Primary Examiner*—Gene Z. Rubinson
*Assistant Examiner*—Mark H. Paschall
*Attorney, Agent, or Firm*—Gabriel P. Katona

[57] ABSTRACT

There is disclosed a plasma burner which has contact protection for protecting the operator against impermissibly high voltage and the burner head itself against destruction. The plasma burner comprises a burner shaft, a nozzle and a nozzle cap surrounding the nozzle, with cooling water flowing between them, a cathode disposed coaxially in the nozzle, a fault current protective circuit and a voltage indicator, disposed over the nozzle cap and insulated therefrom by an air gap is an electrically conductive protective cap.

5 Claims, 2 Drawing Figures

PLASMABURNER WITH CONTACT PROTECTION

BACKGROUND OF THE INVENTION

The invention relates to a plasma burner which has contact protection means for protecting the operator from impermissible high voltage and the burner head from destruction.

The device is preferably used for burners with which have a transmitted electric arc and in which the nozzle, nozzle cap or other metallic nozzle attaching elements carry a voltage in relation to the workpiece.

Known plasma burners, especially manual plasma burners, are equipped with various devices for the protection of the operator but which do not provide complete protection. It is known to provide the nozzle with a ceramic cap or to coat the nozzle with a layer of ceramic or enamel. The sprays or metal vapors formed during the cutting operation cover the protective caps with a comparatively thin metal coating, so that electric contact is made with the nozzle. In this manner, large, voltage-carrying areas may be produced on the burners which could be touched accidently during the operation.

These above mentioned protective devices must be regarded as dangerous because although they are called protective devices they can lose their protective function during the operation of the burner. Another more effective contact protective device is known which is free of the above mentioned drawbacks, but has technical disadvantages. In that device, the nozzle cap is separated from the nozzle by a ceramic insulator and a resilient seal. The protective cap is connected to the workpiece or earth potential via a fault current protective circuit. If the switching threshold of the protective circuit is exceeded by a suddenly occurring voltage potential, the plasma current source is disconnected. (DD PS No. 63 823, corresponding to U.S. Pat. No. 3,558,973, Pochert et al.)

This device has the drawback that the fault voltage monitoring system fails if the nozzle cap contacts the workpiece in difficult cutting positions, such as occur for example, in angular plates and elbows. If, in that case an arc flash-over or a metallic bridge formation takes place on the ceramic insulator, as a rule the insulator is destroyed by thermal overload. Another disadvantage is that the nozzle cap is exposed to electrolytic decomposition, caused by the high voltage potential between nozzle and nozzle cap. The cooling water acts in this case as an electrolyte. Due to this decomposition, the nozzle caps leaks at the places they are clamped.

It is the object of the invention, to avoid the drawbacks of the known devices and to provide a plasma burner which reliably meets the requirements of electrical contact protection.

BRIEF DESCRIPTION OF THE INVENTION

The invention is provides a plasma burner which renders possible a ready exchange of the nozzle and protective means, although they are both electrically insulated from one another as to obviate electrolytic processes, which may destroy the nozzle due to corrosion. In addition to providing contact protection for the operator, it is required that the protective circuit operates even if the protective means or the nozzle contact the workpiece.

The objects of the invention are fulfilled with a plasma burner, comprising a burner shaft, a nozzle and a nozzle cap surrounding said nozzle, with cooling water flowing, between them, a cathode disposed coaxially in the nozzle, a fault current protective circuit and a voltage indicator effecting switching functions arranged between a workpiece and the nozzle to monitor the nozzle for the presence of a voltage potential in relation to the workpiece. Wherein an electrically conductive protective cap identically shaped to the nozzle cap of the burner and insulated therefrom by an air gap surrounding the entire surface, is disposed over the nozzle cap. For the fastening of the protective cap to the plasma burner shaft, at least two contact pieces are provided, each of which is electrically connected via a cable to the fault current protective circuit. Connected in series to the voltage indicator is a resistor to which is connected in parallel at least one capacitor having a diode connected in series.

The voltage indicator effecting switching functions are connected by known means between the workpiece and the nozzle to monitor the nozzle for the presence of a voltage potential in relation to the workpiece. According to the invention, a resistor, preferably a relay is arranged in series with the voltage indicator; parallel to the resistor, a series arrangement of at least one capacitor and one valve is provided. The capacitor is charged by the nozzle potential. By means of its accumulated electrical charge, device it is possible to examine the satisfactory operation of the plasma burner in various operating conditions can be checked by comparison and by connection to switching contacts of the plasma device. Thus it is possible to distinguish whether a plasma burner connected with indirect (non-transmitted) arc or with direct (transmitted) arc is connected. With an indirect arc, of the nozzle is not monitored, because in that type of operation the nozzle is at earth potential.

If the fault current circuit becomes active with the direct operation, the plasma device is immediately switched off.

If the nozzle potential suddenly fails, only the cutting operation is interrupted. The operator can switch on the plasma burner by pressing the button, again. If thereafter the nozzle voltage remains zero, the plasma device is switched off by means of the previously obtained capacitor comparison voltage. The operator is thus informed that there is something wrong with the plasma burner or with its operation. For instance, a bridge formation between the nozzle and the protective cap has to be eliminated, or the operation at the nozzle-workpiece contact has to be corrected. If the plasma burner is switched off by the operator, or the arc discharge is torn off at the workpiece end, the voltage indicator, conditioned by a capacitor arranged in parallel with the resistor, responds with a delay. Faulty recording is prevented by a plasma device relay contact which opens earlier. For plasma burner having power outputs higher than 20 kW, advantageously the protective cap has narrow slots to prevent a possible overheating.

It is advantageous if the protective cap is in a position not completely flush with the nozzle, but the nozzle protrudes slightly from the protective cap. This will not limit the operator's view during the operation.

It is furthermore useful, to fasten the protective cap by means of screw threads or resilient cams at the contact pieces which are disposed on an insulating member of the plasma burner.

As indicators for the fault current and the nozzle potential, relays, semiconductor relays, or semiconductor circuits may be used.

BRIEF DESCRIPTION OF THE DRAWINGS

The invention is more fully understood from an example and the accompanying drawings in which FIG. 1 Is an axial section through a plasma burner in the area of the nozzle and nozzle cap.

DETAILED DESCRIPTION OF THE INVENTION

Figure 1:
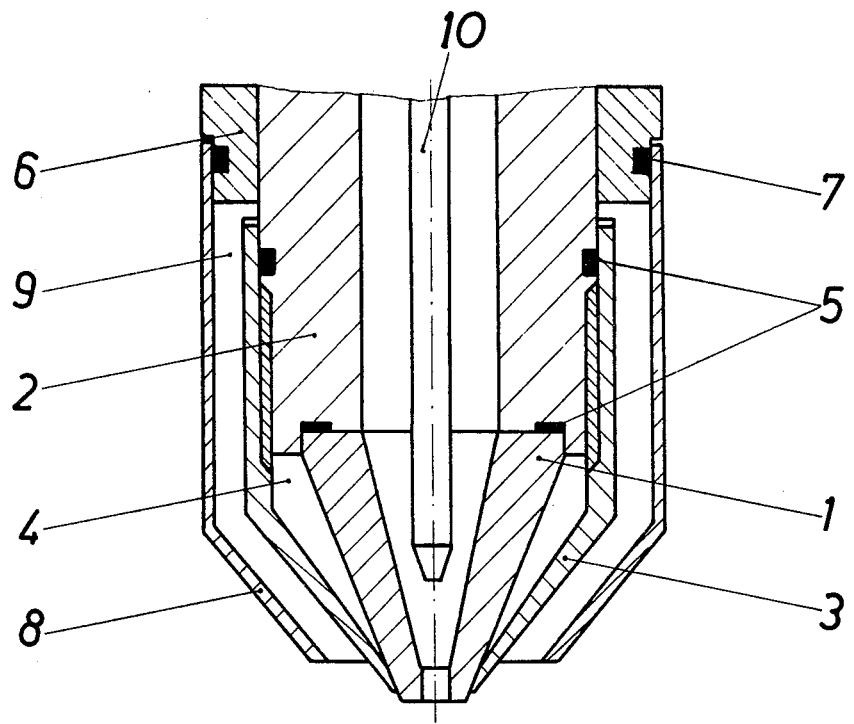
Figure 2:
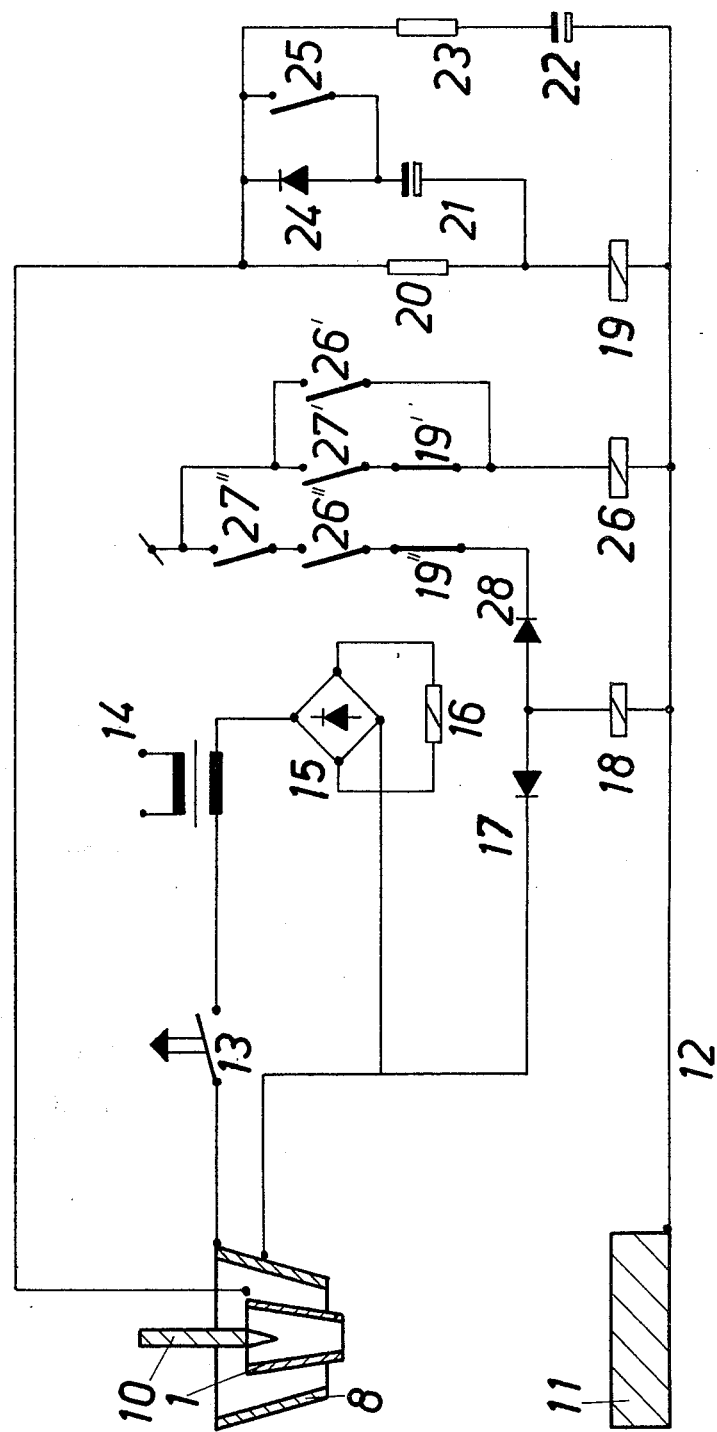
FIG. 2 Is a circuit diagram with relay arrangements.

The nozzle 1 is centrally arranged in a nozzle holder 2 and held by nozzle cap 3. The cooling water space 4 necessary for the cooling of nozzle 1, is metallically sealed between the nozzle 1 and nozzle cap 3, whereas the nozzle holder 2 is sealed by a rubber ring 5. During operation nozzle cap 3 and nozzle 1 carry a voltage potential with relation to a workpiece 11. (FIG. 2). By means of an insulating body 6, the nozzle holder 2, nozzle 1, and nozzle cap 3 are electrically separated from the plasma burner casing. Two contact pieces 7 in the form of half rings are inserted in the insulating body 6, to each of which contact pieces a protective cable extends for the fault current monitoring of the plasma device. Machined into the surface of the contact pieces 7 is a screw thread which retains an electrically conductive protective cap 8 at the inner wall of its top end (as viewed in FIG. 1). Alternatively, the protective cap 8 may be connected to the contact pieces 7 by resilient cams (not shown). The two contact pieces 7 are electrically connected to one another by the protective cap 8 which may be provided with apertures (not shown). An air gap 9 insulates the nozzle cap 3 and protective cap 8 from one another. The plasma burner is built up coaxially around a cathode 10.

FIG. 2 shows a circuit arrangement with relays having a known fault-current protective circuit. The plasma burner is illustrated with the specific structural elements, namely cathode 10, nozzle 1, and protective cap 8. The workpiece 11 is connected to the circuit via line 12 with the circuit.

Two protective conductors which can be short-circuited by the protective cap 8 extend therefrom via a "On-Off" switch 13 to a low-voltage transformer 14, a rectifier 15 and a relay 16. The relay 16 controls with its contacts, the "On-Off" switch of the plasma device. The protective cap 8 is additionally connected via the diode 17 directly to a fault current relay 18. When a fault current flows via the protective cap 8 to the fault current relay 18, the latter closes and the contacts of relay 18 trigger the emergency stop-page of the plasma device.

The nozzle 1 is connected via a resistor 20 to a relay 19 as well as to the capacitors 21,22, a resistor 23, a diode 24 and the contact 25 (the contact is in the plasma device). If the plasma burner is opertaing normally, the nozzle 1 carries a voltage potential in relation to the workpiece 11. This voltage causes the relay 19 to close, and simultaneously charges the capacitors 21 and 22. If the cutting process is interrupted, the relay 19 opens with a delay due to by the discharge of the capacitor 22. As a result, the contacts of the relay 19 cannot operate in the "On-Off" circuit of the plasma device. But, if during the operation of the plasma burner, splashes cause a short circuit bridge to build up between the nozzle 1 and the protective cap 8, the fault current monitoring system of the protective cap 8 cannot work because the protective cap 8 directly lies on the workpiece 11, the relay 19 immediately opens and switches the plasma burner off. In such a case there is no delat. This event is stored by the closing of the relay 26.

The contacts 19' and 19" are closed circuit contacts which are opened when the relay 19 closes. The contacts 27' and 27" are assigned to relays which are part of, the control circuit of the plasma device. The contacts 27' and 27" are closed during the cutting process, but open at different times. When a cutting start is smooth the contacts 26' and 26" open sooner than the contacts 27' and 27" close. If the operator switches the plasma-burner on after a malfunction and if the malfunction is still present, the contact 25, which is closed during the burning of the pilot arc, causes the capacitor 21 to discharge over the bridge formed between the nozzle 1 and the protective cap 8. Due to the discharge, the relay 19 briefly closes and when it opens, the fault current relay 18 is activated over the contacts 26'; 26"; 21; 19" and the diode 28, and that triggers the emergency stoppage system.

By means additional diode wiring of the relay 19 in the form of the diodes 17 and 28, further monitoring of the plasma device, e.g. workpiece contact or thermal overload protection can be provided. With protective cap 8 missing, the plasma burner cannot be switched on, because it also switched on and off over this protective circuit of the. At the same time, the nozzle 1 and therefore the nozzle cap 3 also are monitored during cutting for the presence of a voltage potential in relation to the workpiece 11.

We claim:

1. A plasma burner with a contact protection device comprising;

a nozzle having concentrically therein, a cathode;

a nozzle cap around said nozzle with a space therebetween for cooling water flow;

an electrically conductive protective cap around said nozzle cap electrically spaced therefrom by an air space, said protective cap electrically connected to a fault clearing circuit;

a voltage indicator connected between a workpiece and said nozzle which functions as a switching device supervising the voltage potentials therebetween;

wherein said electrically conductive protective cap is fastened electrically insulated on the shaft of the plasma burner by at least two contact pieces, each of which is connected by a line to the protective fault clearing circuit connection and, in said circuit, a resistor in series to said voltage indicator, at least one capacitor having a diode in series is in parallel to said resistor.

2. A plasma burner according to claim 1, wherein the protective cap is provided with apertures.

3. A plasma burner according to claims 1 or 2, wherein the nozzle slightly protrudes from the protective cap.

4. A plasma burner according to claim 3, wherein the protective cap is fastened to the contact pieces by means of screw threads or resilient cams.

5. A plasma burner according to claim 4, wherein the voltage indicator is a semiconductor circuit, semiconductor relay, or an electromechanical relay.

* * * * *